Figure 1:
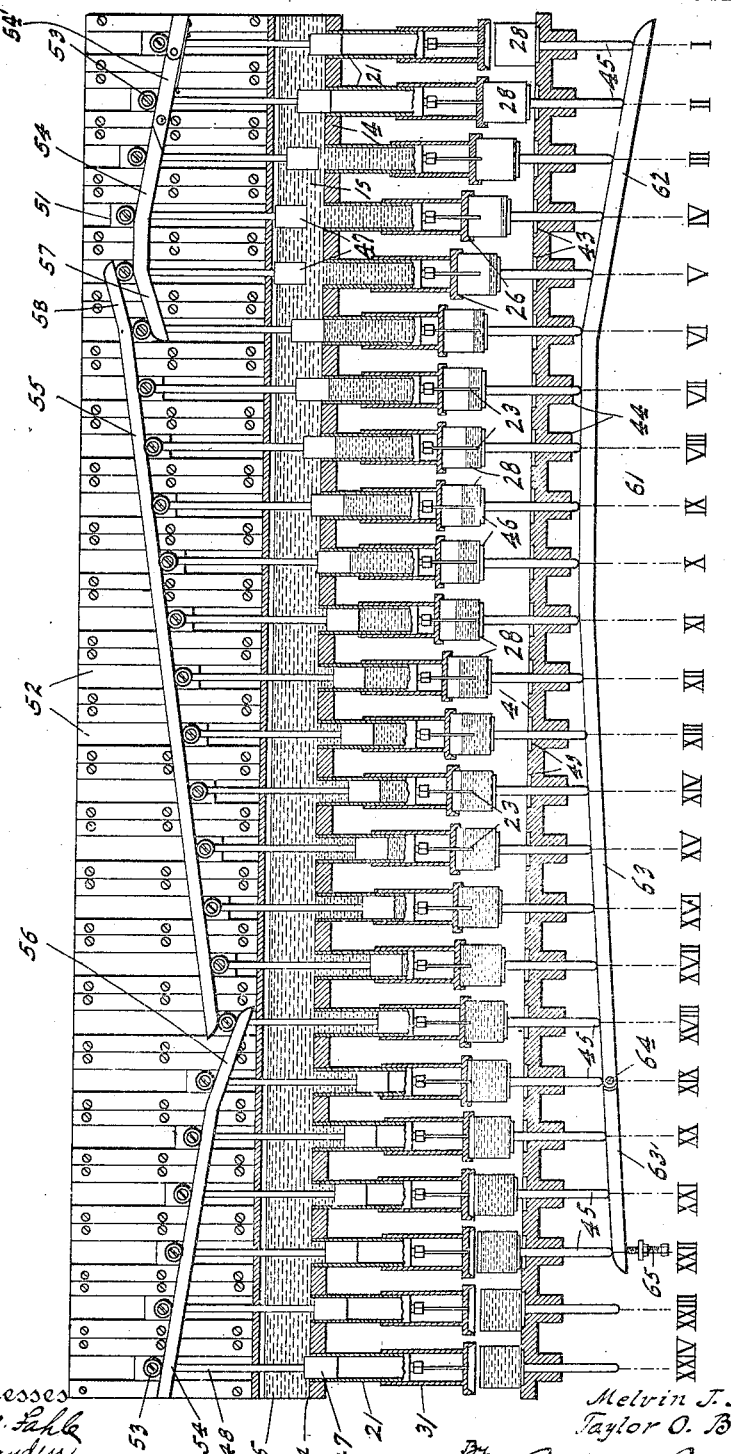

M. J. FLEMING & T. O. BALLARD.
PACKAGE FILLER.
APPLICATION FILED JULY 17, 1911.

1,046,762.

Patented Dec. 10, 1912.

3 SHEETS—SHEET 1.

Witnesses
Frank A. Fahl
May Layden

Inventors
Melvin J. Fleming
Taylor O. Ballard,
By Arthur M. Hood
Attorney

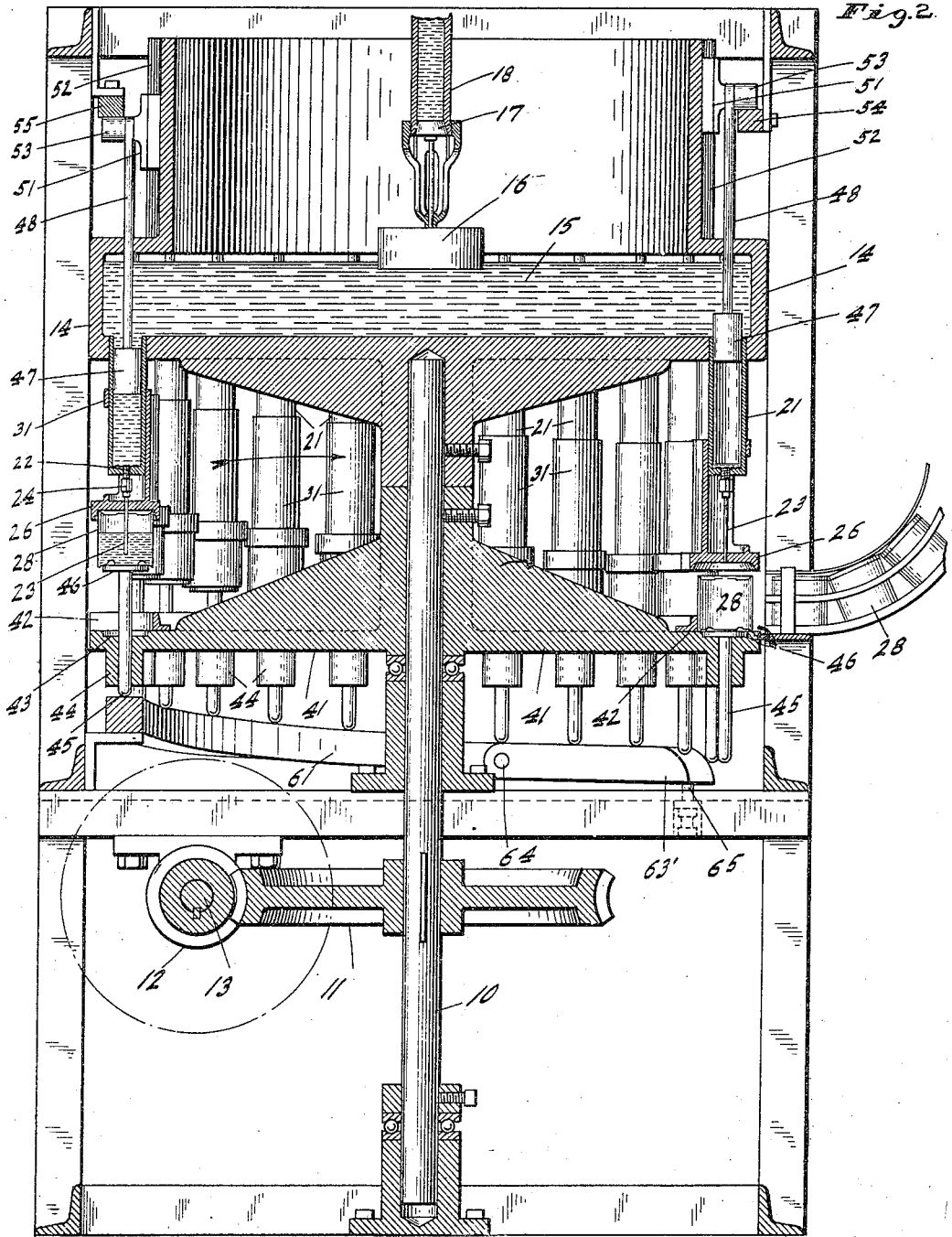

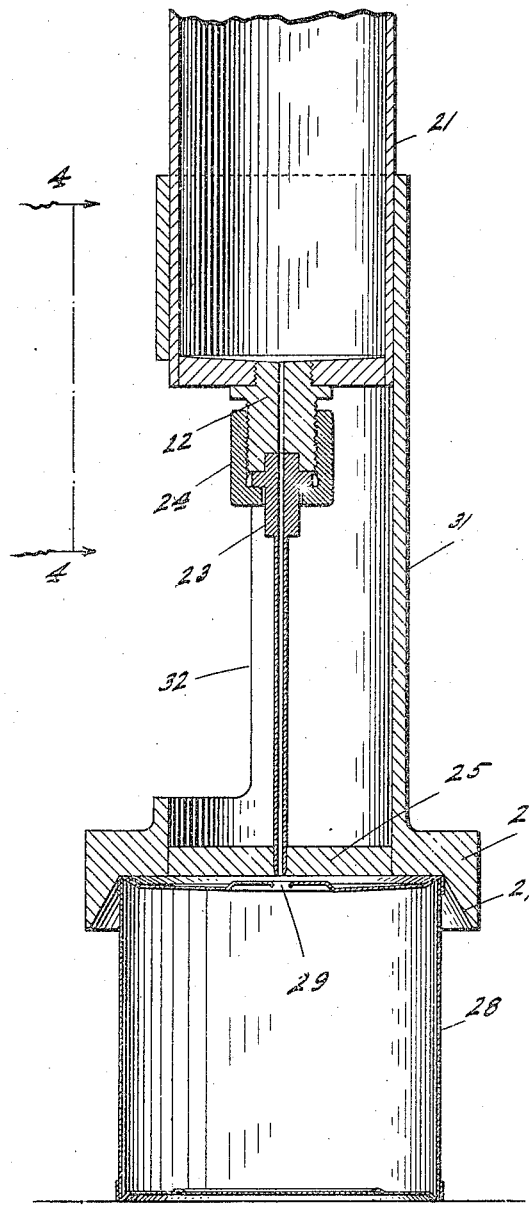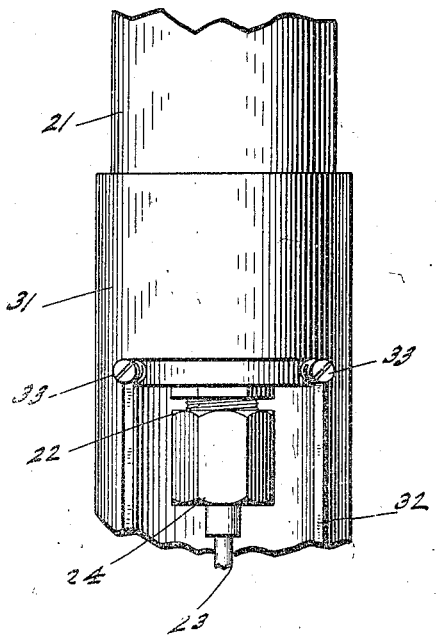

UNITED STATES PATENT OFFICE.

MELVIN J. FLEMING, OF GREENWOOD, AND TAYLOR O. BALLARD, OF FRANKLIN, INDIANA, ASSIGNORS TO GRAFTON JOHNSON, OF GREENWOOD, INDIANA.

PACKAGE-FILLER.

1,046,762.   Specification of Letters Patent.   Patented Dec. 10, 1912.

Application filed July 17, 1911. Serial No. 638,930.

*To all whom it may concern:*

Be it known that we, MELVIN J. FLEMING, residing at Greenwood, Johnson county, Indiana, and TAYLOR O. BALLARD, residing at Franklin, in the county of Johnson and State of Indiana, have invented a new and useful Package-Filler, of which the following is a specification.

The object of our invention is to produce an apparatus by means of which cans or other receptacles may be automatically filled with an exact quantity of liquid or semi-liquid, the construction being such as to prevent frothing during the filling action and also such as to prevent dripping of any material from the filling tube during the withdrawal of the filled receptacle and placing of an empty receptacle.

The accompanying drawings illustrate our invention.

Figure 1 is a developed circumferential section, largely diagrammatic, of our apparatus; Fig. 2 an axial section; Fig. 3 an enlarged axial section of the can centering head and the filling tube; Fig. 4 a fragmentary elevation on line 4—4 of Fig. 3.

In the drawings, 10 indicates an upright shaft rotated by suitable means, such as gears 11 and 12 and main drive shaft 13. Carried by the upper end of shaft 10 is a reservoir 14 adapted to contain a quantity of liquid 15, such, for instance, as condensed or evaporated milk, to be placed in receptacles. The normal level of liquid 15 may be maintained automatically, if desired, by means of a float 16 carrying valve 17 controlling the lower end of a delivery pipe 18. Extending downwardly from the bottom of reservoir 14, in a circumferential series, are a number of measuring cylinders 21, the upper open end of each of which is secured in the bottom of reservoir 14 so as to communicate with the interior of the reservoir. At the lower end of each cylinder 21 is a perforated nipple 22 to the lower end of which is secured a filling tube 23, said filling tube being preferably readily detachable from and attachable to the nipple 22 by means of a coupling 24. The tube 23 is very small, being shown practically full size in Fig. 3, and in order to protect it at its lower end, it is projected through a neatly fitting opening formed through a plate 25 carried by the can centering head 26. Head 26 at its lower end is provided with an inverted cup 27 into which the upper end of the can 28 may be projected, the bottom of the cup being substantially the same diameter as the top of the can so that the can will have its small filling opening 29 always accurately centered relative to the lower end of the filling tube 23. Head 26 is carried at the lower end of a tube 31 which is vertically slidably mounted upon cylinder 21, the tube 31 being cut away for a portion of its length along one side as indicated at 32 and pins 33, carried by cylinder 21, projected through said opening in order to prevent rotation of the centering head and to limit its vertical movement.

Secured to shaft 10, below reservoir 14, is a can-receiving table 41 which is provided on its upper surface with a circumferential series of can pockets 42, each of which is formed for the ready reception of a can 28. In the bottom of each can pocket 42 is a recess 43 which surrounds the upper end of a vertical bearing 44 in which is mounted a vertically reciprocating plunger or pin 45 which, at its upper end, is provided with a head 46 fitting recess 43 and of such size as to form a substantial support for a can 28 when the same is projected into pocket 42.

Table 41 rotates with shaft 10 and reservoir 14 and is so positioned upon the shaft that its several pockets 42 will register vertically with cylinders 21 and their centering heads 26. Lying within the reservoir 14 is a circular series of ejecting plungers 47, each of which fits snugly into the upper end of a cylinder 21. Each plunger 47 is carried by a stem 48 secured to a cross head 51 vertically reciprocable in suitable guide-ways 52 at the end of reservoir 14. Each cross head 51 carries a roller 53 by means of which the cross head and connecting plunger may be reciprocated, the said rollers engaging in succession two cams 54 and 55, the cam 54 producing upward movements of the plunger and cam 55 producing downward movements of the plunger. The cams 54 and 55 overlap each other in order to maintain the plungers at all times under positive control. It will be readily understood that the function of these two cams might be performed by a single cam slot properly formed if desired.

Cam 54 in the middle portion of its length has a general upward inclination of comparatively small amount but its initial end 56 has a sharp pitch upwardly and its final end 57 has a comparatively sharp downward pitch which is overlapped by the correspondingly pitched initial end 58 of the cam 55.

Arranged beneath the path of travel of pins 44 is a stationary cam 61, the middle portion of which is horizontal. The initial end 62 of cam 61 has a comparatively sharp upward pitch and the final end 63 of said cam has a less sharp downward pitch, the tip 63' of said cam being preferably pivoted at 64 to the portion 63 so that its final end may be vertically adjusted by a temper screw 65.

Referring now more particularly to Fig. 1, the operation of the apparatus is as follows: Shaft 10 with its attached parts being set in motion, an empty can 28 is delivered in any suitable manner to the position I. In this position, plunger 47 lies in the upper end of cylinder 21 and is still moving upwardly therein because of the engagement of roller 53 with the main portion of cam 54, this upward movement being comparatively slow and sufficient to prevent any downward flow or leakage through the filling tube of any liquid which may be in the cylinder and filling tube. As the table advances, the can is carried to position II and projected upwardly into engagement with the centering head 26 so that its filling opening 29 will come accurately into registry with the lower end of the filling tube 23, the plunger 47 at this time still lying within the upper end of cylinder 21. By the time the position III has been reached, the upward movement of the can will have continued so that the filling tube will have been projected downward slightly into the upper end of the can and plunger 47 will be withdrawn from the upper end of cylinder 21 so that the fluid 15 may flow downwardly into said cylinder and begin its flow through the filling tube into the can. This initial flow of the fluid is comparatively slow, however, and no great amount of fluid passes into the can until position VI is reached, at which time the can will have been projected up enough to bring the lower end of the filling tube 23 almost to the bottom of the can so that the discharge end of the tube is submerged in the liquid in the can. At this position 6, the plunger 47, as shown, will have been projected downwardly into the upper end of cylinder 21 by the initial end 58 of cam 55. Continued rotation of the shaft will bring the can to position XI, the can during this period remaining vertically stationary but the plunger 47 moving downwardly so as to project the liquid into the can. From position XI to position XVIII, the can will be permitted, by portion 63 of cam 61, to move down slowly, the lower end of the filling tube, however, being kept submerged at all times by the liquid within the can and when position XVIII is reached, the can will be practically full. It is undesirable, however, to have the can entirely full and, therefore, while the can is being moved from the position XVIII to XIX, plunger 47 will be given a quick upward movement by portion 56 of cam 54 so as to suck back through the filling tube from the can the surplus liquid within the can. Therefore as the can is permitted to move downwardly and ultimately to be freed from the centering head 26, the plunger 47 will be moved up gradually so as to at all times maintain a sufficient suction upon the liquid remaining within the lower end of the cylinder and the filling tube to prevent any drippage. By this means it is possible to discharge the filled cans from the machine in a clean condition so that the filling opening may be quickly closed by a drop of solder without the necessity of any preliminary wiping of drippage from the top of the can.

We claim as our invention:

1. In a machine for filling receptacles, the combination of a fluid reservoir, a cylinder depending therefrom, a filling tube forming the outlet from said cylinder, a plunger mounted within the cylinder, a support for receiving a package to be filled and holding the same in coöperative relation with the filling tube, and means for relatively moving the package support and the filling tube, and the plunger and cylinder, to project the filling tube into the package to a position near its bottom, to allow the cylinder to be filled with liquid, to cause the plunger to project the liquid into the package, to withdraw the filling tube partially from the package to a predetermined amount of inward projection, to move the plunger upwardly to extract surplus from the package to a predetermined level, to separate the package from the filling tube, and to continue the upward suction movement of the plunger to prevent drip leakage from the filling tube from the time the filled package is withdrawn from the filling tube until an unfilled package may be associated with the filling tube.

2. In a can filling machine, means for supporting a package, a filling cylinder having a filling tube, means for associating and disassociating the tube with packages successively placed on said supporting means, means for projecting liquid from the cylinder through the tube into a package associated therewith, and means for maintaining a sufficient active suction within said cylinder and tube after the tube and package have been disassociated to prevent dripping during the time of removal of a filled package from the filling tube and the association of an empty package with the filling tube.

3. In a machine for filling receptacles, the combination of a fluid reservoir, a cylinder depending therefrom, a filling tube forming the outlet from said cylinder, a plunger mounted within the cylinder, a support for receiving a package to be filled and holding the same in coöperative relation with the filling tube, and means for relatively moving the package support and the filling tube, and the plunger and cylinder, to project the filling tube into the package to a position near its bottom, to allow the cylinder to be filled with liquid, to cause the plunger to project the liquid into the package, to withdraw the filling tube partially from the package to a predetermined amount of inward projection, to move the plunger upwardly to extract surplus from the package to a predetermined level, to separate the package from the filling tube, to continue the upward suction movement of the plunger to prevent drip leakage from the filling tube from the time the filled package is withdrawn from the filling tube until an unfilled package may be associated with the filling tube, and for starting said suction movement of the plunger sharply.

4. In a machine for filling receptacles, the combination of a fluid reservoir, a plurality of cylinders communicating therewith, a filling tube leading from each cylinder, a plunger for each cylinder, a support for receiving a package to be filled and holding it in coöperative relation with the filling tube of each cylinder, means for successively moving the corresponding package supports and filling tubes relatively to each other to extend each of the latter into and nearly to the bottom of a package on said support and to withdraw it from such package, and means for successively moving the corresponding plungers and cylinders relatively to each other to admit fluid from the reservoir to each cylinder after the corresponding filling tube has been inserted into the package, then to force such fluid from the cylinder through the filling tube into the package, then to withdraw from the filled package a little of the fluid thus injected into it, and then, after the filling tube has been withdrawn from the package, to maintain a slight suction through the filling tube into the cylinder to prevent dripping as an unfilled package is substituted for a filled one.

5. In a machine for filling receptacles, the combination of a fluid reservoir, a cylinder communicating therewith, a filling tube leading from the cylinder, a plunger for the cylinder, a support for receiving a package to be filled and holding it in coöperative relation with the filling tube, means for moving the package support and filling tube relatively to each other to extend the latter into and nearly to the bottom of a package on said support and to withdraw it from such package, and means for moving the plunger and cylinder relatively to each other to admit fluid from the reservoir to such cylinder after the filling tube has been inserted into the package, then to force such fluid from the cylinder through the filling tube into the package, then to withdraw from the filled package a little of the fluid thus injected into it, and then, after the filling tube has been withdrawn from the package, to maintain a slight suction through the filling tube into the cylinder to prevent dripping as an unfilled package is substituted for a filled one.

6. In a machine for filling receptacles, the combination of a fluid reservoir, a plurality of cylinders communicating therewith, a filling tube leading from each cylinder, a plunger for each cylinder, a support for receiving a package to be filled and holding it in coöperative relation with the filling tube of each cylinder, means for successively moving the corresponding package supports and filling tubes relatively to each other to extend each of the latter into and nearly to the bottom of a package on said support and to withdraw it from such package, and means for successively moving the corresponding plungers and cylinders relatively to each other to admit fluid from the reservoir to each cylinder after the corresponding filling tube has been inserted into the package, then to force such fluid from the cylinder through the filling tube into the package, and then, after the filling tube has been withdrawn from the package, to maintain a slight suction through the filling tube into the cylinder to prevent dripping as an unfilled package is substituted for a filled one.

7. In a machine for filling receptacles, the combination of a fluid reservoir, a cylinder communicating therewith, a filling tube leading from the cylinder, a plunger for the cylinder, a support for receiving a package to be filled and holding it in coöperative relation with the filling tube, means for moving the package support and filling tube relatively to each other to extend the latter into and nearly to the bottom of a package on said support and to withdraw it from such package, and means for moving the plunger and cylinder relatively to each other to admit fluid from the reservoir to such cylinder after the filling tube has been inserted into the package, then to force such fluid from the cylinder through the filling tube into the package, and then, after the filling tube has been withdrawn from the package, to maintain a slight suction through the filling tube into the cylinder to prevent dripping as an unfilled package is substituted for a filled one.

8. In a machine for filling receptacles, the combination of a fluid reservoir, a plurality of cylinders communicating therewith, a filling tube leading from each cylinder, a plunger for each cylinder, a support for receiving a package to be filled and holding it in coöperative relation with the filling tube of each cylinder, means for successively moving the corresponding package supports and filling tubes relatively to each other to extend each of the latter into a package on said support and to withdraw it from such package, and means for successively moving the corresponding plungers and cylinders relatively to each other to admit fluid from the reservoir to each cylinder after the corresponding filling tube has been inserted into the package, then to force such fluid from the cylinder through the filling tube into the package, then to withdraw from the filled package a little of the fluid thus injected into it, and then, after the filling tube has been withdrawn from the package, to maintain a slight suction through the filling tube into the cylinder to prevent dripping as an unfilled package is substituted for a filled one.

9. In a machine for filling receptacles, the combination of a fluid reservoir, a cylinder communicating therewith, a filling tube leading from the cylinder, a plunger for the cylinder, a support for receiving a package to be filled and holding it in coöperative relation with the filling tube, means for moving the package support and filling tube relatively to each other to extend the latter into a package on said support and to withdraw it from such package, and means for moving the plunger and cylinder relatively to each other to admit fluid from the reservoir to such cylinder after the filling tube has been inserted into the package, then to force such fluid from the cylinder through the filling tube into the package, then to withdraw from the filled package a little of the fluid thus injected into it, and then, after the filling tube has been withdrawn from the package, to maintain a slight suction through the filling tube into the cylinder to prevent dripping as an unfilled package is substituted for a filled one.

10. In a machine for filling receptacles, the combination of a fluid reservoir, a plurality of cylinders communicating therewith, a filling tube leading from each cylinder, a plunger for each cylinder, a support for receiving a package to be filled and holding it in coöperative relation with the filling tube of each cylinder, means for successively moving the corresponding package supports and filling tubes relatively to each other to extend each of the latter into a package on said support and to withdraw it from such package, and means for successively moving the corresponding plungers and cylinders relatively to each other to admit fluid from the reservoir to each cylinder after the corresponding filling tube has been inserted into the package, then to force such fluid from the cylinder through the filling tube into the package, and then, after the filling tube has been withdrawn from the package, to maintain a slight suction through the filling tube into the cylinder to prevent dripping as an unfilled package is substituted for a filled one.

11. In a machine for filling receptacles, the combination of a fluid reservoir, a cylinder communicating therewith, a filling tube leading from the cylinder, a plunger for the cylinder, a support for receiving a package to be filled and holding it in coöperative relation with the filling tube, means for moving the package support and filling tube relatively to each other to extend the latter into a package on said support and to withdraw it from such package, and means for moving the plunger and cylinder relatively to each other to admit fluid from the reservoir to such cylinder after the filling tube has been inserted into the package, then to force such fluid from the cylinder through the filling tube into the package, and then, after the filling tube has been withdrawn from the package, to maintain a slight suction through the filling tube into the cylinder to prevent dripping as an unfilled package is substituted for a filled one.

In witness whereof, we have hereunto set our hands and seals at Greenwood, Indiana, July, A. D. one thousand nine hundred and eleven.

MELVIN J. FLEMING. [L. S.]
TAYLOR O. BALLARD. [L. S.]

Witnesses:
NOBLE B. RITCHEY,
R. W. CRARY.